United States Patent Office 2,887,471
Patented May 19, 1959

2,887,471

POLYMERIZATION OF α-OLEFINS TO SOLID POLYMER BY MEANS OF AN ALKALI METAL ALKYL AND A SUPPORTED OXIDE

Newton H. Shearer, Jr., and Harry W. Coover, Jr., Kingsport, Tenn., assignors to Eastman Kodak Company, Rochester, N.Y., a corporation of New Jersey No Drawing. Application November 29, 1955
Serial No. 549,836

13 Claims. (Cl. 260—93.7)

This invention relates to an improved process for forming solid polymers of normally gaseous α-olefins and is particularly concerned with a process for catalytic polymerization of olefinic hydrocarbons using a mixture of a soluble catalyst and a solid supported catalyst.

For many years, the olefins were polymerized to low molecular weight liquid hydrocarbons by catalytic means. These processes normally employed pressures below 200 atmospheres during the polymerization. It was then discovered that, with the use of extremely high pressures of the order of 500 atmospheres or higher, the very short chain olefins such as ethylene could be polymerized to give solid polymer. This high pressure solid polyethylene has, of course, found great utility in a variety of commercial applications. It is flexible and relatively low melting but forms excellent sheets and films wherein a high degree of strength is not necessary.

More recently it has been found that α-olefins such as ethylene or propylene could be catalytically polymerized with certain specific catalyst combinations to give high molecular weight polyolefins having unusually high crystallinity and density. Thus, polyethylene produced by a catalytic process was considerably stiffer than polyethylene produced by the previously employed high pressure processes.

One general type of catalytic process which has received considerable attention involved the use of certain specific metal oxides, preferably spread on a solid support, for polymerizing the gaseous olefins to solid polymer. The best known processes of this kind are the Standard Oil process typified by U.S. Patent 2,691,647 and the Phillips process typified by Belgian Patent 530,617.

In the Phillips process chormium oxide on silica alumina formed the polymerization catalyst. It was usually necessary to employ special activation techniques for the catalyst and support in order to achieve the requisite degree of activity. Thus, it was necessary that at least a portion of the catalyst consist of hexavalent chromium, and the activity of the catalysts varied greatly with changes in the proportions of the silica to the alumina and with the activation procedure. In the Phillips process it was shown that molybdenum oxide in the hexavalent state was completely ineffective for forming solid polymer even at pressures of the order of 600–1000 p.s.i. ordinarily employed in the Phillips process.

In contrast to this, the Standard Oil process involved the use of an oxide of chromium, molybdenum, tungsten or uranium, but it was necessary to employ the metal oxide in combination with an alkali metal or in a particular state of reduction. Thus, the catalyst ordinarily was reduced partially to give an average valence state lower than 6. In the case of an oxide such as molybdenum oxide, this lowered valence state was necessary for activity at all in the absence of an alkali metal promoter.

Both of the previously known processes thus depended upon specific activation methods for achieving the optimum catalyst activity. Furthermore, the plugging of the solid catalyst with the polymer formed during the reaction was a problem, and it was necessary to regenerate the catalyst bed periodically in order to maintain the desired degree of activity.

It was therefore an object of this invention to provide an improved process for preparing solid polyolefins from normally gaseous α-olefins employing a solid bed catalyst and a liquid or soluble catalyst in combinations not known heretofore. Another object of the invention is to avoid the disadvantages inherent in the supported catalyst processes known heretofore, and particularly to avoid the necessity of careful pretreatment of the catalytic materials involving either activation with heat and steam under particular conditions or partial reduction of the oxide catalyst. Another object of the invention is to provide an improved process for continuously producing polyethylene, polypropylene, or copolymers thereof, in substantially complete conversion by passing a solution of olefin and a soluble catalyst over a bed of solid supported catalyst. Another object of the invention is to facilitate the commercial production of high molecular weight, high density, crystalline polyolefins. Other objects will be apparent from the description and claims which follow.

These and other objects are attained by means of the process embodying this invention wherein greatly improved results are achieved by employing two quite dissimilar catalytic materials in combination in the polymerization process in liquid phase. Thus, we have found that the normally gaseous α-olefins containing 2–10 carbon atoms, either singly or in admixture, can be polymerized to high density, highly crystalline solid polymers by contacting the α-olefin in solution in an inert liquid vehicle with a soluble catalyst comprising an alkali metal alkyl wherein the alkyl group contains 1–12 carbon atoms and a solid supported catalyst comprising an oxide of chromium, molybdenum or tungsten extended upon a solid support comprising alumina, silica, or mixtures thereof. Although the process embodying the invention can be effected batchwise in the usual pressure reactor or autoclave, the invention is particularly applicable for preparing polyolefins in a continuous process wherein a soluton of the olefin being polymerized together with the alkali metal alkyl is passed over the supported oxide catalyst at a temperature of from about 0° C. to about 250° C. and preferably at a temperature of 90–200° C. Under these conditions, the conversion of the olefin to solid polymer is practically quantitative despite the fact that no particular activation procedures have been used for the support and no reduction or partial reduction procedure employed for the oxide. The exact mechanism by which the mixture catalyzes the polymerization is not known, although both components contribute in large measure to the unexpectedly good results which are obtained.

The polymerization in accordance with this invention proceeds readily at temperatures of from 20 to 300° C. and at pressures from about atmospheric pressure up to very high pressures. It is usually desirable in the continuous processes preferred for commercial operation to employ a liquid reaction vehicle in which the polymer being produced is soluble at elevated temperatures but relatively insoluble at room temperature. In this way, it is possible to carry out the polymerization process at a temperature wherein the product formed remains dissolved in the vehicle and then can be separated out by allowing the vehicle to cool. The combination of the soluble catalyst and supported catalyst in accordance with the invention not only makes the activation of the catalyst components unnecessary but also gives a process wherein the supported catalyst can be used for greatly extended periods without plugging and without the necessity of being withdrawn for regeneration or reactivation. This is of particular advantage in continuous commercial processing since a stationary catalyst bed can be employed and the polymerization solution passed continuously over the bed. The soluble alkali metal alkyls when employed alone are not effective as polymerization catalysts for forming solid polymers, particularly under the temperature and pressure conditions herein disclosed. The metal oxides, such as chromium oxide, molybdenum oxide, and tungsten oxide, when employed alone are also ineffective as polymerization catalysts. When the metal oxide is supported on a solid support of difficultly reducible metal oxide such as silica, alumina or mixtures thereof, however, and this supported catalyst is used in combination with the soluble catalyst, the commercial production of solid polyethylene and similar polyolefins in very high yield is readily attainable.

The alkali metal alkyl can be either a sodium alkyl, a potassium alkyl or a lithium alkyl wherein the alkyl group contains 1–12 carbon atoms. The sodium alkyls are preferred for optimum results, although the other alkali metal alkyls can be used with excellent catalytic activity in the combinations herein defined. Thus, the soluble catalyst can include such materials as methyl sodium, ethyl sodium, butyl sodium, amyl sodium, methyl lithium, ethyl lithium, isopropyl lithium, butyl lithium, amyl lithium, decyl lithium, dodecyl lithium, ethyl potassium, butyl potassium, amyl potassium, octyl potassium, dodecyl potassium, and similar alkali metal alkyls of 1–12 carbon atoms. The soluble alkali metal alkyl catalyst can be used in any desired concentration in the liquid reaction vehicle, although it is usually employed in a concentration of from about 0.1 to 10% by weight based on the weight of the vehicle. When the process is carried out batchwise, it is usually necessary to employ much higher concentrations of soluble catalyst than is the case in the continuous flowing stream processes. In the latter type of process, concentrations of 0.1 to 1% are usually sufficient, although concentrations of as high as 4% or 6% are sometimes employed with excellent results. The relative proportions of the soluble catalyst and the supported catalyst can also be varied over a wide range depending upon the particular type of process employed. In a batch process, the ratio of weight of the soluble catalyst to the supported catalyst can be anywhere in the range of from about 1:20 to 1:1. Ordinarily the batch processes employ a lesser amount by weight of the soluble catalyst than of the supported catalyst. In a continuous process, the ratio of the two components can be varied even more widely since the soluble catalyst is usually employed in a concentration of from 0.1 to 10% by weight of the mixture being passed over the bed of supported catalyst. The amount of supported catalyst in the bed will, of course, depend upon the type of apparatus used, the contact time desired, the rate of passage of polymerization mixture over the catalyst, and similar variable factors. The supported catalyst can contain from about 1% to about 20% by weight of the chromium, molybdenum, or tungsten oxide based on the total weight of the support with amounts of from about 3 to 20% being desirably employed. In some cases, amounts as high as 40% of the metal oxide on the support can be used. The temperature of the polymerization process can be anywhere in the range of 0–250° C. but is desirably of the order of 90–200° C. for best results. The pressure of the system can also be varied rather widely but ordinarily pressures of from about 10 p.s.i. to about 600 p.s.i. are sufficient for commercial operation, although pressures of as high as 20,000 p.s.i. or higher can be used if desired.

In the practice of the invention, the chromium, molybdenum or tungsten oxide can be deposited on the support in any desired manner. A procedure which can be easily carried out was described by Grosse and Ipatieff, Ind. Eng. Ch. 32, 268–272 (1949). The procedure therein described involves deposition from an aqueous solution of oxide, nitrate or an ammonium derivative onto the support. The deposited catalyst can then be dried at temperatures up to 350° C. or higher to form a layer of the desired oxide on the support. Any of the well known difficultly reducible metal oxide supports can be used, but best results are obtained with supports comprising alumina, silica or mixtures thereof. The catalytic activity does not depend upon any particular physical form of the support or any particular chemical constitution thereof. Consequently, any of the well known forms of alumina, silica or silica-alumina can be used including those which have been activated and those which have not. The supported catalyst can be used in the form of powder or pellets are desired, depending upon the type of reaction. The use of pellets of approximately ⅛ inch size has proven to be eminently satisfactory, particularly in the continuous flowing stream processes, since this catalyst does not tend to wash out of the system in the flowing stream.

The invention is carried out in liquid phase employing an inert organic liquid vehicle. The liquid vehicles which are preferably employed are the inert hydrocarbon vehicles such as the alkanes as typified by pentane, hexane, heptane and the like, cycloalkanes such as cyclohexane, aromatic solvents such as benzene, toluene, xylenes, napthalenes, and the like, as well as such derivatives as chlorobenzene, chloronaphthalene, and the like. The ketones, alcohols and similar oxygenated solvents are not particularly good solvents for the polyolefins and hence are employed primarily to reduce the solubility of the polymer in the reaction vehicle rather than as the vehicle itself.

The invention can be employed for polymerizing any of the normally gaseous olefins, and particularly those containing 2–10 carbon atoms such as 1-pentene, 1-hexene, 1-decene, and the like, and is particularly applicable for polymerizing ethylene, propylene and mixtures thereof. The polymers prepared in accordance with the invention have molecular weights greater than 1000 and usually greater than 10,000. Molecular weights even above 1,000,000 can be readily attained by means of this process as defined. The poly-$\alpha$-olefins obtained from ethylene and propylene have softening or fusion points above 130° C. The polyethylenes are insoluble in solvents at ordinary temperatures but are partially soluble in such solvents as xylene, toluene or tetralin at temperatures of about 100° C. With the exception of compounds of extremely high molecular weight, the polyethylenes obtained according to this invention are soluble in tertalin at 145° C. The polyethylenes embodying the invention are characterized by high crystallinity, generally higher than about 80% as shown by X-ray diagrams. In fact, the crystallinities of most polyethylenes obtained by this process average close to 90%, and the number of methyl groups per hundred carbon atoms is usually of the order of 0.5 or lower. This low degree of chain branching results in densities much higher than are achieved with high pressure polyethylenes, densities of 0.945 or higher being commonly obtained. The inherent viscosity of the various polyethylenes hereby obtained, as measured in tetralin at 145° C., can be varied from about 0.5 or lower to 5.0 or higher. Melt indices as measured by the standard ASTM method can also be varied from about 0.01 to 100 or even higher.

As an example, polyethylene prepared by this process and having a molecular weight in the range of 50,000 will have a density in excess of 0.945, a softening temperature of at least 130° C., a tensile strength of 3000 to 5500 p.s.i., and a stiffness in flexure at 5% deflection (ASTM Test D747–50) of at least 50,000 p.s.i. The polymers embodying the invention can be formed into flexible plates or films between heated plates or by extrusion through a suitable die. The products combine stiffness and high softening point and hence can be employed in many applications wherein the usual high pressure polyethylene does not possess the requisite properties. The polymers can be extruded in the form of pipe or tubing, injection molded into a great variety of articles, or cold drawn into ribbons, bands, fibers or filaments of high elasticity and rigidity. Fibers of high strength can be readily spun from the molten polyethylene according to this process.

Polypropylene can likewise be prepared in similar fashion and also exhibits unusually high crystallinity and density. Other solid polymers having similarly enhanced characteristics can also be prepared. A particularly valuable class of products are the copolymers of ethylene and propylene wherein the relative proportions of the monomers can be varied to give any desired combination of properties ranging from the relatively stiff polyethylene to the relatively soft and rubbery polypropylene.

Although the polymerization embodying the invention can be carried out batchwise in an autoclave or pressure reactor, it is desirably carried out in a continuous flowing stream process. In this type of process, the conversion of monomer to solid polymer is generally almost quantitative, and the process is particularly adapted for preparation of products of closely controlled properties. Thus, the mixture of vehicle monomer and soluble catalyst being introduced into the polymerization zone can be kept substantially uniform in composition, and the rate of introduction can also be maintained at a uniform rate. Since at temperatures above 90° C. particularly the solid supported catalyst does not become plugged or inactivated by the polymer, the relative concentrations of the various components in the system thus remain substantially unchanged throughout the process. When the temperature is also maintained substantially constant and the mixture resulting from the polymerization is withdrawn from the system at the same rate that fresh mixture is being introduced, polymers of extremely uniform molecular weight are readily obtained in high yield. Such polymers offer definite advantages for some applications since they are substantially free of the low molecular weight and high molecular weight fractions ordinarily found in polymers prepared by the usual batch reactions or by many of the flowing stream continuous reactions.

The monomer being charged to the polymerization process is preferably substantially pure, although the ethylene or propylene or the like monomers may contain varying amounts of hydrogen or hydrocarbons such as methane, ethane, propane or the like. In the case of the preparation of copolymers, of course, the charging stock will consist of a mixture of monomers in the desired proportions. Since the pressures employed might only be sufficient to maintain the reaction mixture in liquid form under the polymerization conditions, the pressure is readily obtained by joining the reaction system to a source of the gas being polymerized under pressure. In many cases, pressures of 10–30 p.s.i. of ethylene or like monomer are as much as is necessary for substantially complete conversion. The polymerization reaction will vary somewhat in speed depending upon the reaction conditions, concentrations, and similar variable factors. The contact time in the continuous process will usually be considerably less than in the batch reactions wherein the contact will ordinarily run from about 1 to 24 hours, and usually from 1 to 4 hours. In the continuous processes, the reaction time may be varied from a few minutes to a few hours, with contact times of from one-half to one hour usually being sufficient. The concentration of monomer in the liquid reaction medium will usually be in the range of 2–25% by weight and preferably 2–10% by weight. At concentrations above about 10% by weight, the rate of polymerization increases, but the increased amount of polymer dissolved in the vehicle gives highly viscous solutions which are difficult to handle. The solvent to catalyst ratio can be varied over a wide range of from about 1 to about 3000 or higher for flowing stream continuous processes. Even with very high solvent ratios, the presence of the soluble catalyst causes rapid polymerization during passage over the supported catalyst to give the desired products.

The practice of the invention and certain preferred embodiments is illustrated by the following examples. It will be understood, however, that the examples are illustrative only and are not intended to limit the scope of the invention unless otherwise specifically indicated.

*Example 1*

As has been indicated, the catalytic polymerization process embodying the invention can be carried out either batchwise or continuously, the continuous process being preferred. In a typical example of a continuous process embodying the invention, 400 g. of a tungsten oxide-alumina catalyst which contained 10% by weight of the tungsten oxide was thoroughly dried by evacuation under nitrogen at 350° C. for 2 hours and was then charged in the form of ⅛ inch pellets into a tubular reactor which had been flushed with nitrogen. A continuous polymerization was run by blending a toluene solution containing 4% ethylene with a toluene solution containing 0.5% amyl sodium suspended therein and passing the two solutions concurrently over the supported oxide catalyst at a rate of 3000 ml. per hour. This total amount of solution per hour was made up of 2600 ml. of the toluene solution of ethylene and 400 ml. of the amyl sodium suspension. The toluene solution being passed over the supported oxide catalyst was maintained at a temperature of 150° C. and under a pressure of 600 p.s.i. whereby solid polymer formed in the reactor was desorbed from the supported catalyst and passed through the reactor in the toluene vehicle. The hot toluene effluent was removed at a rate corresponding to the rate of introduction and was allowed to cool, whereupon solid high density polyethylene precipitated therefrom. It was found that substantially complete conversion of the ethylene feed to high molecular weight polyethylene having an inherent viscosity of approximately 1.5 was obtained. This solid polymer was characterized by a very high crystallinity of the order of 90%, a density above 0.95, and a softening point above 130° C. The polymer possessed a considerably higher degree of rigidity than polyethylene of corresponding molecular weight prepared by the conventional high pressure processes. The polymer showed excellent utility for making molded and extruded articles such as fibers, films, tubing and the like.

The conditions described in this example were also used effectively with both molybdenum oxide and chromium oxide catalysts. Since the results obtained with the various catalyst combinations under widely varying temperature and pressure conditions were generally similar, such other examples will not be described in detail herein since they are not necessary for an understanding of the inventive process.

*Example 2*

As has been indicated, the process proceeds batchwise with somewhat less advantageous results, but a number of examples of batchwise reactions are being included to illustrate many of the variations in the process. All of these variations can be used in the continuous process described in Example 1 with even better results.

A dry 500 ml. pressure bottle was flushed with nitrogen and then charged with 100 ml. of dry heptane followed by 12 g. of solid catalyst comprising pellets of activated alumina having 1% by weight of chromium oxide deposited thereon. Thereafter 1 g. of amylsodium was added. This mixture was then again flushed with nitrogen and attached to an ethylene source at 10 p.s.i. gauge pressure. The mixture was agitated at room temperature for 72 hours, whereupon the solid polymer was washed with alcohol and water and dried. The high molecular weight, highly crystalline polyethylene was removed from the solid catalyst by dissolving it in tetralin at 150° C. A 14 g. yield of solid polyethylene having an inherent viscosity of 1.3 was obtained.

Example 3

The type of support, the nature of the catalyst components, and the relative proportions thereof can be varied widely. Thus, the procedure of the preceding example was followed using as the catalyst combination 2 g. of sodium amyl with 2 g. of a solid catalyst comprising 10% by weight of tungsten oxide supported on 90:10 silica-alumina. The process was carried out in an autoclave for 2 hours at a temperature of 250° C. and an ethylene pressure of 20,000 p.s.i. A 12 g. yield of high molecular weight, highly crystalline polyethylene was obtained.

Example 4

Ethylene was polymerized in heptane solution by contact with a catalyst combination composed of 4 g. of amylsodium and 1 g. of a solid catalyst comprising 20% chromium oxide deposited on alumina, at room temperature for 6 hours. The yield of high molecular weight, highly crystalline solid polyethylene was 23 g. of polymer having an inherent viscosity of 1.8.

Example 5

Ethylene was polymerized in an autoclave in heptane solution at a pressure of 1000 p.s.i. and a temperature of 200° C. for 1 hour in the presence of a catalyst combination consisting of 5 g. of dodecyl sodium and 1 g. of 10.90 molybdenum oxide-silica.

Example 6

Although the sodium alkyls are conveniently used, the other alkali metal alkyls can also be used with excellent results. Thus, ethylene was polymerized at room temperature in 48 hours using a catalyst combination consisting of 2 g. of ethyl lithium and 10 g. of a solid catalyst comprising 10% by weight of chromium oxide deposed on alumina. The yield of high molecular weight, highly crystalline polyethylene obtained at a pressure of 10 p.s.i. on the heptane solution was 22 g. Similar results were also obtained with the potassium derivatives which showed excellent activity.

Example 7

The nature of the reaction vehicle is subject to considerable variation, and excellent results are obtained with both the aromatic and the aliphatic hydrocarbon vehicles. Thus, a tubular reactor was charged with 10% tungsten oxide supported on alumina, and toluene solutions of ethylene and amylsodium were continuously introduced into the reactor and passed over the supported catalyst at a temperature of 150° C. and 600 p.s.i. The concentration of amyl sodium was about 0.1% of the total weight of reaction vehicle. With the temperature maintained substantially constant and the introduction and withdrawal rates being equivalent, substantially complete conversion of the ethylene feed to high molecular weight, highly crystalline polyethylene was obtained. The control of the various rates, temperatures, concentrations, etc. at unchanged values throughout the polymerization process gave a polymeric product of extremely uniform molecular weight. It was also found that the contiuous process as described could be run successfully with other solvents such as mineral oil, Stoddard solvent, cyclohexane and chlorobenzene with effective conversion of the monomer feed to high molecular weight, highly crystalline polymer. The process was also effective with the alkyl lithiums such as ethyl lithium and the alkyl potassiums such as potassium amyl using chromium oxide, molybdenum oxide or tungsten oxide on the various supports. There appeared to be little difference in the yield obtained due to the nature of the support employed. It thus appeared that the support functioned primarily in furnishing a surface for the metal oxide catalyst, and it was not necessary to have a specially activated support or a support of carefully controlled constitution. Furthermore, the state of oxidation of the metal oxide did not appear to be critical, and it was not necessary to reduce the oxide to obtain a valence state below 6 in order to achieve activity in the catalyst combinations.

Example 8

The procedure of Example 1 was followed using propylene as the olefinic monomer in place of ethylene. It was found that this continuous process was also effective in giving substantially complete conversion of the propylene to polypropylene of high molecular weight and high crystallinity. The procedure of Example 2 was then also carried out using 1-butene, 1-pentene and 1-decene. In every case, the process was effective in converting these α-olefins into polymers which were solid, high molecular weight, highly crystalline materials. The achievement of such solid high density polymers resulted with all of the catalyst combinations as defined herein, and it was apparent that the conditions, reactants, catalyst combinations, and similar variable factors could all be varied as desired within the scope of the invention as herein described with excellent results. The process was also highly effective for preparing copolymers such as the various copolymers of ethylene and propylene.

Thus, by means of this invention solid polyethylene and similar polyolefins are readily prepared in high yield and in a process which is peculiarly adapted for large scale commercial manufacture. The specific conditions which characterize the usual solid bed catalyst systems are not a factor in the practice of the present invention. The polymer obtained is of excellent quality and can be used alone or blended with the relatively more flexible polymer obtained by conventional high pressure processes to give any combination of properties desired. The polymers can also be blended with other polymeric materials or can be compounded with the usual pigments, fillers, plasticizers, softeners, coloring agents and the like as desired. Aside from the relatively greater density, stiffness and crystallinity, the polymers prepared in accordance with the invention can be processed in substantially the same manner as the polyolefins known to the art heretofore.

Although the invention has been described in detail with particular reference to certain preferred embodiments thereof, it will be understood that variations and modifications can be effected within the spirit and scope of the invention as described hereinabove and as defined in the appended claims.

We claim:

1. In the process of polymerizing α-monoolefinic hydrocarbon material containing 2–10 carbon atoms to form solid polymer, the improvement which comprises effecting the polymerization at a temperature of 0–250° C. and in liquid dispersion in an inert organic liquid and in the presence of a supported catalyst comprising a support from the group consisting of alumina, silica and mixtures thereof having deposited thereon from 1 to 40% by weight based on the weight of the alumina support of a trioxide of a metal from the group consisting of chromium, tungsten and molybdenum, and a soluble alkali metal alkyl catalyst wherein the alkyl group contains 1–12 carbon atoms.

2. In the process of polymerizing at least one α-monoolefin from the group consisting of ethylene and propylene to form solid polymer, the improvement which comprises effecting the polymerization in an inert liquid hydrocarbon at a temperature of 90–200° C. and in the presence of a supported catalyst comprising a support from the group consisting of alumina, silica and mixtures thereof having deposited thereon from 1 to 20% by weight based on the weight of said alumina of a trioxide of a metal from the group consisting of chromium, tungsten and molybdenum and a soluble alkyl sodium catalyst wherein the alkyl group contains 1–12 carbon atoms.

3. In the process of polymerizing at least one α-monoolefin from the group consisting of ethylene and propylene to form solid polymer, the improvement which comprises effecting the polymerization in an inert liquid hydrocarbon at a temperature of 90–200° C. and in the presence of a supported catalyst comprising a support from the group consisting of alumina, silica and mixtures thereof having deposited thereon from 1 to 20% by weight based on the weight of said alumina of a trioxide of a metal from the group consisting of chromium, tungsten and molybdenum and a soluble alkyl lithium catalyst wherein the alkyl group contains 1–12 carbon atoms.

4. The process which comprises progressively passing over a supported catalyst comprising a support from the group consisting of alumina, silica and mixtures thereof having deposited thereon from 1 to 20% by weight of a trioxide of a metal from the group consisting of chromium, tungsten and molybdenum, a solution, in an inert liquid hydrocarbon, of at least one α-monoolefin from the group consisting of ethylene and propylene and a soluble alkali metal alkyl catalyst wherein the alkyl group contains 1–12 carbon atoms, said solution being maintained at a temperature of 90–200° C. during passage over said supported catalyst.

5. The process which comprises progressively and continuously passing over supported catalyst comprising a support from the group consisting of alumina, silica and mixtures thereof having deposited thereon from 3 to 20% by weight of a trioxide of a metal from the group consisting of chromium, tungsten and molybdenum, a solution, in an inert liquid hydrocarbon, of at least one α-monoolefin from the group consisting of ethylene and propylene and a soluble alkyl sodium catalyst wherein the alkyl group contains 1–12 carbon atoms, the weight ratio of said soluble catalyst to said supported catalyst being in the range of from 1:20 to 20:1, said solution being maintained at a temperature of 90–200° C. during passage over said supported catalyst.

6. The process which comprises progressively and continuously passing over a supported catalyst comprising a support from the group consisting of alumina, silica and mixtures thereof having deposited thereon from 3 to 20% by weight of a trioxide of a metal from the group consisting of chromium, tungsten and molybdenum, a solution, in an inert liquid hydrocarbon, of at least one α-monoolefin from the group consisting of ethylene and propylene and a soluble alkyl lithium catalyst wherein the alkyl group contains 1–12 carbon atoms, the weight ratio of said soluble catalyst to said supported catalyst being in the range of from 1:20 to 20:1, said solution being maintained at a temperature of 90–200° C. during passage over said supported catalyst.

7. The process which comprises progressively and continuously passing over an insoluble supported catalyst comprising a predominantly alumina support having deposited thereon from 3 to 20% by weight of an oxide of tungsten, a solution, in an inert liquid hydrocarbon, of ethylene and soluble amyl sodium catalyst while maintaining said solution at a temperature of 90–200° C. during passage over said supported catalyst, the weight ratio of said soluble catalyst to said supported catalyst being in the range of from 1:20 to 20:1.

8. The process which comprises progressively and continuously passing over an insoluble supported catalyst comprising a predominantly alumina support having deposited thereon from 3 to 20% by weight of an oxide of molybdenum, a solution, in an inert liquid hydrocarbon, of ethylene and soluble amyl sodium catalyst while maintaining said solution at a temperature of 90–200° C. during passage over said supported catalyst, the weight ratio of said soluble catalyst to said supported catalyst being in the range of from 1:20 to 20:1.

9. The process which comprises progressively and continuously passing over an insoluble supported catalyst comprising a predominantly alumina support having deposited thereon from 3 to 20% by weight of an oxide of chromium, a solution, in an inert liquid hydrocarbon, of ethylene and soluble ethyl lithium catalyst while maintaining said solution at at temperature of 90–200° C. during passage over said supported catalyst, the weight ratio of said soluble catalyst to said supported catalyst being in the range of from 1:20 to 20:1.

10. The process which comprises progressively and continuously passing over an insoluble silica-alumina support having deposited thereon from 3 to 20% by weight of tungsten oxide, a solution, in an inert liquid hydrocarbon, of ethylene and amyl sodium, the weight ratio of said amyl sodium to said supported catalyst being in the range from 1:20 to 20:1, said solution being maintained at a temperature of 90–200° C. during passage over said supported catalyst.

11. The process which comprises progressively and continuously passing over an insoluble alumina support having deposited thereon from 3 to 20% by weight of tungsten oxide, a solution, in an inert liquid hydrocarbon, of propylene and amyl sodium, while maintaining said solution at a temperature of 90–200° C., the weight ratio of said amyl sodium to said supported catalyst being in the range of from 1:20 to 20:1.

12. In the polymerization of normally gaseous α-monoolefins containing 2–10 carbon atoms to form solid polymer, the improvement which comprises effecting the polymerization in an inert organic liquid in the presence of an oxide of a metal from the group consisting of chromium, molybdenum and tungsten, and an alkali metal alkyl catalyst wherein the alkyl group contains 1–12 carbon atoms, at a temperature of 0–250° C.

13. In the polymerization of normally gaseous α-monoolefins containing 2–10 carbon atoms to form solid polymer, the improvement which comprises effecting the polymerization in an inert organic liquid in the presence of a supported catalyst composed of an oxide of a metal from the group consisting of chromium, molybdenum and tungsten, supported on a difficultly reducible metal oxide support, and an alkali metal alkyl catalyst wherein the alkyl group contains 1–12 carbon atoms, at a temperature of 0–250° C.

References Cited in the file of this patent

UNITED STATES PATENTS

| | | |
|---|---|---|
| 2,691,647 | Field et al. | Oct. 12, 1954 |
| 2,721,189 | Anderson et al. | Oct. 18, 1955 |
| 2,725,374 | Mosher | Nov. 29, 1955 |
| 2,728,758 | Field et al. | Dec. 27, 1955 |
| 2,824,089 | Peters et al. | Feb. 18, 1958 |

FOREIGN PATENTS

| | | |
|---|---|---|
| 534,792 | Belgium | Jan. 31, 1955 |